US008995467B2

(12) United States Patent
Diachina et al.

(10) Patent No.: US 8,995,467 B2
(45) Date of Patent: Mar. 31, 2015

(54) SYSTEM AND METHOD FOR PROVIDING INFORMATION INDICATING THE PRIORITY LEVEL OF A NON ACCESS STRATUM SIGNALING MESSAGE AND FOR USING THE PRIORITY LEVEL INFORMATION TO SELECT A RESPONSE

(75) Inventors: John Diachina, Garner, NC (US); Paul Schliwa-Bertling, Ljungsbro (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 856 days.

(21) Appl. No.: 13/048,916

(22) Filed: Mar. 16, 2011

(65) Prior Publication Data
US 2012/0113895 A1    May 10, 2012

Related U.S. Application Data

(60) Provisional application No. 61/412,258, filed on Nov. 10, 2010.

(51) Int. Cl.
| | |
|---|---|
| *H04W 4/00* | (2009.01) |
| *H04L 12/855* | (2013.01) |
| *H04W 28/02* | (2009.01) |
| *H04W 28/10* | (2009.01) |

(Continued)

(52) U.S. Cl.
CPC ....... *H04L 47/2466* (2013.01); *H04W 28/0205* (2013.01); *H04W 28/10* (2013.01); *H04L 47/323* (2013.01); *H04W 60/02* (2013.01)
USPC ............ 370/469; 370/345; 370/442; 370/467

(58) Field of Classification Search
USPC .................................. 370/345, 442, 467, 469
See application file for complete search history.

(56) References Cited

U.S. PATENT DOCUMENTS

| | | | |
|---|---|---|---|
| 7,512,145 B2 * | 3/2009 | Kim | 370/432 |
| 7,948,936 B2 * | 5/2011 | Lohr et al. | 370/329 |
| 8,358,643 B2 * | 1/2013 | Ahluwalia | 370/345 |

(Continued)

FOREIGN PATENT DOCUMENTS

| | | |
|---|---|---|
| WO | WO 2004/036837 A1 | 4/2004 |
| WO | WO 2010/125457 A1 | 11/2010 |

OTHER PUBLICATIONS

"Digital cellular telecommunications system (Phase 2+); General Packet Radio Service (GPRS); Base Station System (BSS)—Serving GPRS Support Node (SGSN); BSS GPRS protocol (BSSGP) (3GPP TS 48.018 version 9.3.0 Release 9)", Technical Specification, European Telecommunications Standards Institute ( ETSI), 650, Route Des Lucioles; F-06921 Sophia-Antipolis, France, vol. 3GPP GERAN 2, No. V9.3.0, Oct. 1, 2010; XP014061745, pp. 38-40, 57-58, 94, 131, 133, 138.

(Continued)

*Primary Examiner* — Jay P Patel

(57) ABSTRACT

A system and method for providing an indication of a priority level of a non access stratum (NAS) message. In one aspect, a wireless communication device transmits a NAS signaling message together with a Packet Flow Identifier (PFI) information element that includes information indicating a priority level of the NAS signaling message. If the NAS signaling message has a low priority, the wireless communication device may receive a response message indicating that the ongoing NAS signaling message scenario can be performed less frequently in the future, thereby mitigating network congestion and radio interference.

20 Claims, 9 Drawing Sheets

(51) Int. Cl.
*H04L 12/823* (2013.01)
*H04W 60/02* (2009.01)

(56) References Cited

U.S. PATENT DOCUMENTS

| | | | | |
|---|---|---|---|---|
| 8,515,465 | B2* | 8/2013 | Olsson et al. | 455/458 |
| 2008/0225785 | A1* | 9/2008 | Wang et al. | 370/329 |
| 2009/0201864 | A1* | 8/2009 | Ahluwalia | 370/329 |
| 2010/0075667 | A1* | 3/2010 | Nakamata et al. | 455/432.3 |
| 2010/0128742 | A1* | 5/2010 | Chun et al. | 370/474 |
| 2011/0070906 | A1* | 3/2011 | Chami et al. | 455/507 |
| 2011/0275342 | A1* | 11/2011 | Ramle et al. | 455/404.1 |
| 2011/0302310 | A1* | 12/2011 | Diachina et al. | 709/225 |
| 2012/0039313 | A1* | 2/2012 | Jain | 370/338 |
| 2012/0069737 | A1* | 3/2012 | Vikberg et al. | 370/232 |
| 2013/0188503 | A1* | 7/2013 | Anepu et al. | 370/252 |

OTHER PUBLICATIONS

"3rd Generation Partnership Project; Technical Specification Group Services and System Aspects; System Improvements for Machine-Type Communications; Release 10)", 3GPP Standard; 3GPP TR 23.888, $3^{RD}$ Generation Partnership Project (3GPP), Mobile Competence Centre; 650, Route Des Lucioles; F-06921 Sophia-Antipolis, France, No. V1.0.0, 22 Sep. 22, 2010, pp. 1-80, XP050442131, [retrieved on Sep. 22, 2010], pp. 16-20, 52-54.

3GPP TS 48.018 V9.3.0 (Sep. 2010), 3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 9), SP-46, GP-47, version 9.3.0, available Oct. 1, 2010, the whole document.

3GPP TS 24.008 V9.4.0 (Sep. 2010), 3rd Generation Partnership Project; Technical Specification Group Core Network and Terminals; Mobile radio interface Layer 3 specification; Core network protocols; Stage 3 (Release 9), CP-49, version 9.4.0, available Sep. 28, 2010, the whole document.

3GPP TS 44.018 V9.6.0 (Sep. 2010), 3rd Generation Partnership Project; Technical Specification Group GSM/EDGE Radio Access Network; Mobile radio interface layer 3 specification; Radio Resource Control (RRC) protocol (Release 9), GP-47, version 9.6.0, available Oct. 1, 2010, the whole document.

3GPP TS 48.008 V9.4.0 (Sep. 2010), 3rd Generation Partnership Project; Technical Specification Group GSM/EDGE Radio Access Network; Mobile Switching Centre—Base Station System (MSC-BSS) interface; Layer 3 specification (Release 9), SP-46, GP-47, version 9.4.0 dated available Oct. 1, 2010, the whole document.

3GPP TS 44.006 V9.1.0 (Mar. 2010), 3rd Generation Partnership Project; Technical Specification Group GSM/EDGE Radio Access Network; Mobile Station—Base Station System (MS-BSS) interface; Data Link (DL) layer specification (Release 9), CP-49, version 9.1.0, available Mar. 25, 2010, the whole document.

3GPP TS 25.331 V9.4.0 (Sep. 2010), 3rd Generation Partnership Project; Technical Specification Group Radio Access Network; Radio Resource Control (RRC); Protocol specification (Release 9), SP-46, RP-49, version 9.4.0, available Oct. 8, 2010, the whole document.

* cited by examiner

SYSTEM AND METHOD FOR PROVIDING INFORMATION INDICATING THE PRIORITY LEVEL OF A NON ACCESS STRATUM SIGNALING MESSAGE AND FOR USING THE PRIORITY LEVEL INFORMATION TO SELECT A RESPONSE

CROSS-REFERENCE TO RELATED APPLICATIONS

The present application claims priority benefit under 35 U.S.C. §119(e) of U.S. Provisional Patent Application No. 61/412,258, entitled "PFI Based Indication of NAS Signaling Priority," filed Nov. 10, 2010, the contents of which are incorporated herein by reference in their entirety.

TECHNICAL FIELD

The present invention relates to non access stratum (NAS) signaling messages, and more particularly, to a system and method for providing and using information indicating the priority level of a NAS signaling message.

BACKGROUND

With the quantity of wireless communication devices that support Machine Type Communications (MTC) expected to dramatically increase in the near future, efforts are underway to mitigate core network and radio interface NAS signaling capacity limitations so as to maximize the number of system access attempts that can be successfully processed during periods of high system loading.

In a conventional packet switched wireless communication system, a wireless communication device may be configured to transmit NAS signaling messages to a core network node (e.g., a Serving General Packet Radio Service (GPRS) Support Node (SGSN)). When a wireless communication device sends a NAS signaling message targeted for an SGSN, such as, for example, a Routing Area (RA) Update message, a base station subsystem (BSS) will receive the NAS signaling message within the context of a Logical Link Control (LLC) Packet Data Unit (PDU), along with a Packet Flow Identifier (PFI) that indicates NAS "signaling" (i.e., PFI=1). The PFI is conveyed from the wireless communication device to the BSS either within a Radio Link Control (RLC) data block header, when a one-phase access is used, or within the Packet Resource Request message, when a two-phase access is used. Once received, the LLC PDU and its corresponding PFI are relayed from the BSS to the SGSN using, for example, a UL-UNITDATA PDU as specified in 3GPP Technical Specification 48.108. However, the PFI is limited to only indicating "signaling" for the case of NAS signaling, as indicated in 3GPP Technical Specification 24.008. As such, the SGSN cannot distinguish between NAS signaling scenarios that can be treated with low priority and NAS signaling scenarios that can be treated with normal priority. The result is a lost opportunity for mitigating core network and radio interface congestion.

In a conventional wireless communication system in the circuit switched (CS) domain, when a wireless communication device needs to send a NAS message targeted for the mobile switching center (MSC), such as, for example, a Location Area Update message, the wireless communication device first sends a Channel Request message to the BSS indicating "Location Updating." The wireless communication device is subsequently sent an Immediate Assignment message that provides the wireless communication device with a Traffic Channel/Stand-Alone Dedicated Control Channel (TCH/SDCCH) resource allocation, which the wireless communication device uses to send a layer 3 service request message to the BSS. The layer 3 service request message consists of a LOCATION UPDATING REQUEST message carried within a layer 2 Set Asynchronous Balanced Mode (SABM) frame. Upon reception of the LOCATION UPDATING REQUEST message, the BSS relays it to the MSC within a COMPLETE LAYER 3 INFORMATION message. However, the layer 3 service request message sent from the MS to the BSS has no way of indicating a priority level associated with the corresponding LOCATION UPDATING REQUEST. As such, when this message is relayed to the MSC, the MSC has no way of knowing when a low priority LOCATION UPDATING REQUEST message has been received. The result is a lost opportunity for mitigating core network and radio interface congestion.

SUMMARY

Particular embodiments of the disclosed solution provide a method, apparatus, and computer program product that enables a determination of a priority level of a particular type of non access stratum (NAS) signaling message transmitted from a wireless communication device (e.g., a mobile terminal or other wireless communication device). In some embodiments, this advantageous solution is achieved by including a priority level indication in a Packet Flow Identifier (PFI) information element. In some embodiments, if the NAS signaling message is determined to have a low priority, a response message may be sent to the wireless communication device from which the NAS signaling message originated. The response message may include instructions that cause the wireless communication device to transmit particular types of NAS signaling messages less frequently.

In one particular aspect, a core network node for use in a wireless communication system is provided. In some embodiments, the core network node is operable to receive from a base station a first message comprising a second message that was transmitted by a wireless communication device and received at the base station. The second message comprises a particular type of non access stratum (NAS) signaling message targeted to the core network node. The core network node is further operable to determine, based on information contained in the first message, a priority level of the received NAS signaling message. In response to receiving the NAS signaling message, the core network node is further operable to select responsive information to include in a response NAS signaling message. The selection of the responsive information is based at least in part on the determined priority level of the received NAS signaling message. The core network node is further operable to transmit to the wireless communication device the response NAS signaling message containing the selected responsive information.

In some embodiments, the wireless communication device may be configured to transmit the particular type of NAS signaling message at least once every X minutes. The responsive information may instruct the wireless communication device to transmit the particular type of NAS signaling message less frequently than once every X minutes. The particular type of NAS signaling message may be a Routing Area (RA) Update request message.

In some embodiments, the first message may be an uplink (UL) UNITDATA message, and the second message may be a Logical Link Control (LLC) protocol data unit (PDU) comprising the NAS signaling message. The UL-UNITDATA message may further comprise a Packet Flow Identifier (PFI)

information element. The core network node may be configured to determine the priority level of the received NAS signaling message by examining the PFI information element. The PFI information element may comprise a PFI value. The core network node may be configured to determine the priority level of the received NAS signaling message using the PFI value. The core network node may be further configured to determine the priority level of the received NAS signaling message by performing a method that consists of determining whether the PFI value is equal to a predetermined value. The core network node may be configured such that if the PFI value is equal to the predetermined value, then the core network node determines that the received NAS signaling message has a low priority.

In some embodiments, the responsive information may be configured to cause the wireless communication device to wait at least a certain amount of time before sending the particular type of NAS signaling message again. The responsive information may specify the certain amount of time.

In another aspect, a method for processing NAS signaling messages transmitted by a wireless communication device is provided. In some embodiments, the method includes receiving, at a core network node, a first message transmitted from a base station. The first message comprises a second message that was transmitted by the wireless communication device and received at the base station. The second message comprises a particular type of NAS signaling message targeted to the core network node. After receiving the first message, the core network node determines a priority level of the received NAS signaling message based on information contained in the first message. Then, in response to receiving the NAS signaling message, the core network node selects responsive information to include in a response NAS signaling message. The selection of the responsive information is based at least in part on the determined priority level of the received NAS signaling message. Next, the response NAS signaling message is transmitted from the core network node to the wireless communication device. The response NAS signaling message contains the selected responsive information.

In yet another aspect, a computer program product for processing NAS signaling messages transmitted by a wireless communication device is provided. The computer program product includes a computer readable medium storing computer readable program code. In some embodiments, the computer readable program code includes a set of instructions for receiving, at a core network node, a first message transmitted from a base station. The first message comprises a second message that was transmitted by the wireless communication device and received at the base station. The second message comprises a particular type of NAS signaling message targeted to the core network node. The computer readable program code further includes a set of instructions for determining a priority level of the received NAS signaling message based on information contained in the first message. The computer readable program code further includes a set of instructions for selecting, in response to receiving the NAS signaling message, responsive information to include in a response NAS signaling message. The selection of the responsive information is based at least in part on the determined priority level of the received NAS signaling message. The computer readable program code further includes a set of instructions for transmitting the response NAS signaling message from the core network node to the wireless communication device. The response NAS signaling message contains the selected responsive information.

In still another particular aspect, a wireless communication device for use in a wireless communication system is provided. In some embodiments, the wireless communication device is operable to transmit a message comprising a particular type of NAS signaling message targeted to a core network node and information identifying a priority level of the transmitted NAS signaling message. The wireless communication device is further operable to receive a response NAS signaling message from the core network node. The response message contains information which is responsive to the transmitted priority level information. The wireless communication device is configured such that, prior to receiving the response NAS signaling message, the wireless communication device is configured to transmit the particular type of NAS signaling message at least once every X minutes. The wireless communication device is configured such that, in response to receiving the response NAS signaling message, the wireless communication device transmits the particular type of NAS signaling message less frequently than once every X minutes.

In some embodiments, the wireless communication device may be further configured to transmit the NAS signaling message to the base station by transmitting one or more Radio Link Control (RLC) data blocks, each including a corresponding RLC data block header. The wireless communication device may be further configured to transmit the priority level information by including the priority level information in (a) at least one of said RLC data block headers or (b) a radio resource control message transmitted from the wireless communication device to the base station immediately prior to starting the transmission of the NAS signaling message.

In yet another particular aspect, a NAS signaling method performed by a wireless communication device is provided. In some embodiments, the wireless communication device is configured to transmit a particular type of NAS signaling message at least once every X minutes. The method includes transmitting, from the wireless communication device, a first message comprising the particular type of NAS signaling message and information identifying a priority level of the transmitted NAS signaling message. After transmitting the first message, the wireless communication device receives a response NAS signaling message transmitted from a core network node in response to the transmitted NAS signaling message. Then, in response to receiving the response NAS signaling message, the particular type of NAS signaling message is transmitted less frequently than once every X minutes. In some embodiments, the responsive information may include an instruction to transmit the particular type of NAS signaling message not more than once every Y minutes.

In still another particular aspect, a computer program product for enabling a NAS signaling method to be performed by a wireless communication device is provided. The computer program product includes a computer readable medium storing computer readable program code. In some embodiments, the wireless communication device is configured to transmit a particular type of NAS signaling message at least once every X minutes. In some embodiments, the computer readable program code includes a set of instructions for causing the wireless communication device to transmit a first message comprising the particular type of NAS signaling message and information identifying a priority level of the transmitted NAS signaling message. The computer readable program code further includes a set of instructions for enabling the wireless communication device to receive a response NAS signaling message transmitted from a core network node in response to the transmitted NAS signaling message, and, in response to receiving the response NAS signaling message, to transmit the particular type of NAS signaling message less frequently than once every X minutes.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

DETAILED DESCRIPTION

Figure 1:
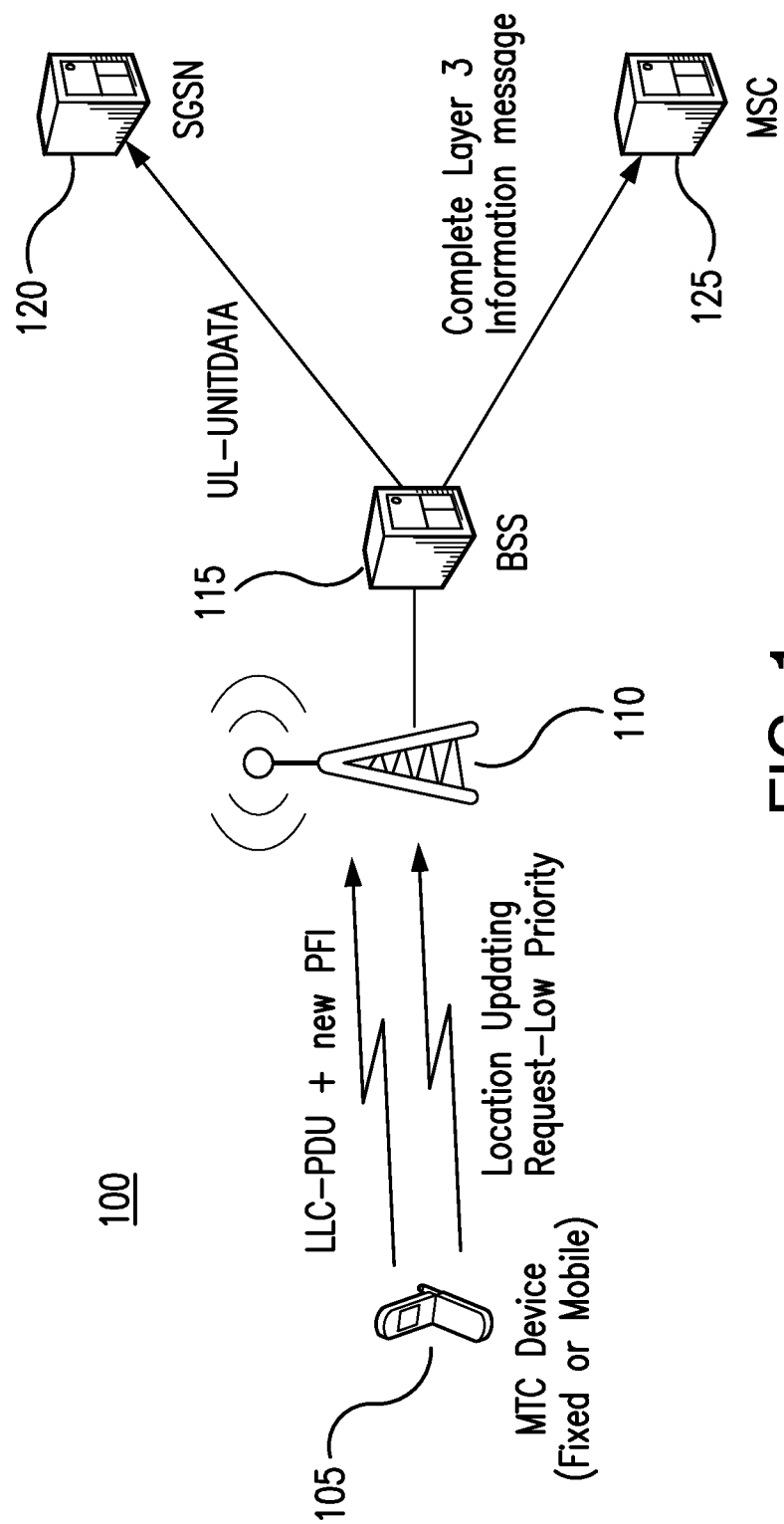
FIG. 1 illustrates a wireless communication system.

One area in which network and radio interference congestion can be mitigated is the area of Non Access Stratum (NAS) signaling. FIG. 1 illustrates an example wireless communication system 100. As shown, wireless communication system 100 includes a wireless communication device 105, which, in the example shown, is a Machine Type Communications (MTC) device (e.g., a machine that automatically communicates with another machine). An example MTC device is a meter that periodically and automatically reports meter readings to a server.

The wireless communication device 105 is configured to transmit NAS signaling messages to a Base Station Subsystem (BSS) 115, which messages are received by a BSS receiving antenna 110. In the Packet Switched (PS) domain, the BSS 115 is in communication with a Serving GPRS Support Node (SGSN) 120. In the Circuit Switched (CS) domain, the BSS 115 is in communication with a Mobile Switching Center (MSC) 125.

It is recognized that some NAS signaling scenarios may be of less real-time importance than other NAS signaling scenarios. For example, a Routing Area (RA) Update message transmitted from a generally fixed wireless communication device (e.g., a meter reader device) may generally be less important than an RA update message transmitted from a mobile terminal (e.g., a mobile phone) because it is much more likely for the mobile terminal to be moving between cells than it is for the generally fixed wireless communication device. Thus, allowing a core network node, such as an SGSN 120 or an MSC 125, to realize when it has received a low priority NAS signaling message from a wireless communication device 105 may enable the mitigation of core network and radio interface congestion, in at least two different ways.

First, the SGSN 120 or MSC 125 can send the wireless communication device 105 a response that indicates that the specific ongoing NAS signaling scenario can be performed less frequently in the future. Second, the SGSN 120 or MSC 125 can send the wireless communication device 105 a response that indicates the type of NAS signaling message (e.g., RA Update message) is rejected or aborted and/or shall not be re-attempted for an indicated time period. For example, the response may include responsive information that may be configured to cause the wireless communication device to wait at least a certain amount of time before sending the type of NAS signaling message again and each subsequent time, and the responsive information may specify the certain amount of time. For instance, before the wireless communication device transmits a particular type of NAS signaling message, the wireless communication device may be configured such that, every X minutes, the wireless communication device transmits the particular type of NAS signaling message, and the responsive information that it sent to the wireless communication device in response to the NAS signaling message may cause the wireless communication device to change the frequency with which it transmits the particular type of NAS message from every X minutes to every Y minutes, where Y>X.

Figure 2:
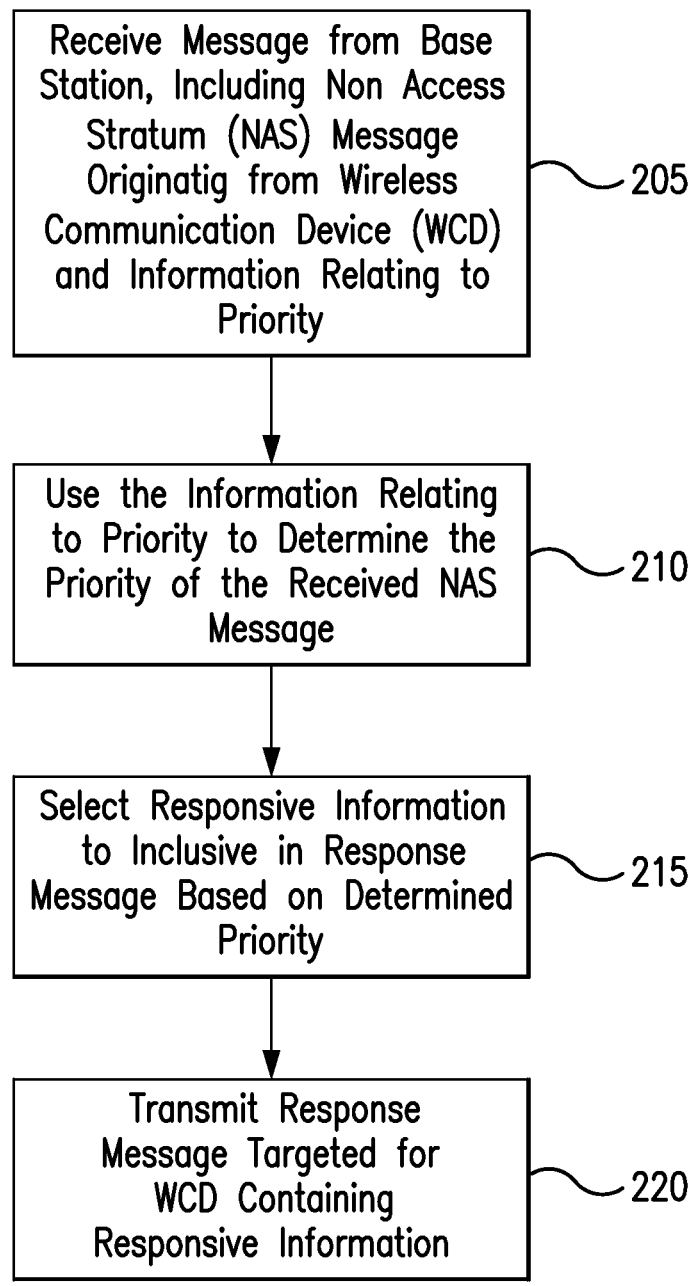
FIG. 2 is a flow chart illustrating a process for determining a priority level of a NAS signaling message and responding to the NAS signaling message, in accordance with exemplary embodiments of the disclosed solution.

Referring now to FIG. 2, a flow chart illustrates a process 200 for determining a priority level of a NAS signaling message and responding to the NAS signaling message in accordance with an exemplary embodiment of the disclosed solution. The process begins at 205 when a core network node (e.g., SGSN 120 or MSC 125) receives a message from base station 115. The received message includes a NAS signaling message originating from a wireless communication device 105. The received message also includes information relating to a priority level of the NAS signaling message. Next, at 210, the core network node uses the information relating to the priority level to determine the priority level of the received NAS signaling message. Then, at 215, the core network node selects responsive information to include in a response message. The selection of responsive information is based on the determined priority level of the received NAS signaling message. Finally, at 220, the core network node transmits a response message targeted for the wireless communication device 105. The response message contains the selected responsive information.

PS Domain

Referring now to Table 1, in accordance with 3GPP Technical Specification 48.018, a description of the UL-UNITDATA PDU is shown. As used in the PS domain, the UL-UNITDATA PDU transfers a wireless communication device's LLC-PDU and its associated radio interface information across the Gb-interface, from the BSS to the SGSN.

TABLE 1

UL-UNITDATA PDU content

| Information element | Type/Reference | Presence | Format | Length |
| --- | --- | --- | --- | --- |
| PDU type | PDU type/11.3.26 | M | V | 1 |
| TLLI | TLLI/11.3.35 | M | V | 4 |

TABLE 1-continued

UL-UNITDATA PDU content

| Information element | Type/Reference | Presence | Format | Length |
|---|---|---|---|---|
| QoS Profile | QoS Profile/11.3.28 | M | V | 3 |
| Cell Identifier | Cell Identifier/11.3.9 | M | TLV | 10 |
| PFI | PFI/11.3.42 | O | TLV | 3 |
| LSA Identifier List | LSA Identifier List/11.3.18 | O | TLV | 3-? |
| Alignment octets | Alignment octets/11.3.1 | O | TLV | 2-5 |
| LLC-PDU(note) | LLC-PDU/11.3.15 | M | TLV | 2-? |

NOTE:
The LLC-PDU Length Indicator may be zero.

Referring now to Table 2, element coding for the Packet Flow Identifier for a BSS Packet Flow Context is shown.

TABLE 2

Packet Flow Identifier (PFI) Information Element

| | 8 | 7 | 6 | 5 | 4 | 3 | 2 | 1 |
|---|---|---|---|---|---|---|---|---|
| octet 1 | | | | Information Element ID | | | | |
| octet 2, 2a | | | | Length Indicator | | | | |
| octet 3 | | | | Rest of element coded as the value part of the Packet Flow Identifier information element in 3GPP TS 24.008, not including 3GPP TS 24.008 IEI | | | | |

Figure 3:
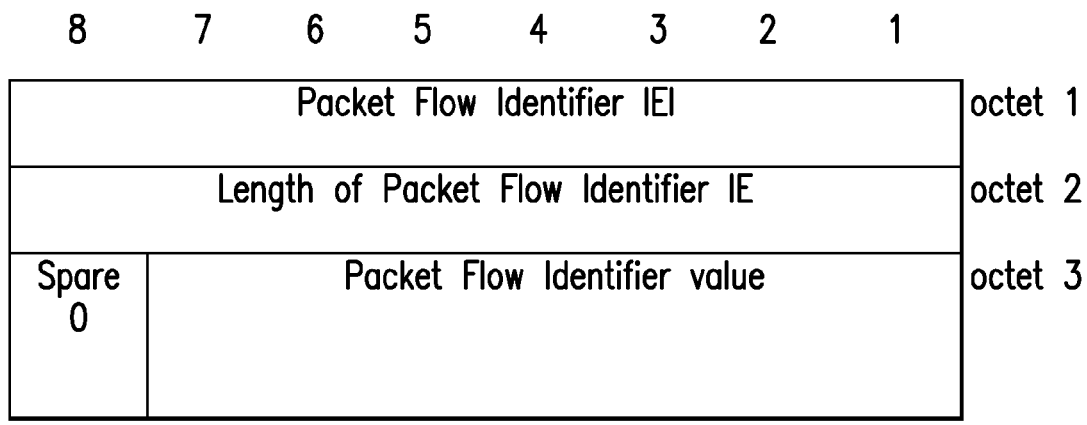
FIG. 3 illustrates a data structure of a Packet Flow Identifier as used in exemplary embodiments of the disclosed solution.

Referring now to FIG. 3, in accordance with 3GPP Technical Specification 24.008, a data structure 300 for the PFI Information Element is shown. The Packet Flow Identifier (PFI) information element indicates the Packet Flow Identifier for a Packet Flow Context. The Packet Flow Identifier is a type 4 information element having a length of three octets. The first octet specifies the PFI Information Element ID. The second octet specifies the length of the PFI Information Element. The third octet provides the PFI value. Referring also to Table 3, the PFI value is coded as shown.

TABLE 3

Packet Flow Identifier Value Coding
Packet Flow Identifier value (octet 3)

Bits

| 7 | 6 | 5 | 4 | 3 | 2 | 1 | | |
|---|---|---|---|---|---|---|---|---|
| 0 | 0 | 0 | 0 | 0 | 0 | 0 | Best Effort | |
| 0 | 0 | 0 | 0 | 0 | 0 | 1 | Signaling | |
| 0 | 0 | 0 | 0 | 0 | 1 | 0 | SMS | |
| 0 | 0 | 0 | 0 | 0 | 1 | 1 | TOM8 | |
| 0 | 0 | 0 | 0 | 1 | 0 | 0 | } | |
| | | | to | | | | } | reserved |
| 0 | 0 | 0 | 0 | 1 | 1 | 1 | } | |
| 0 | 0 | 0 | 1 | 0 | 0 | 0 | } | |
| | | | to | | | | } | dynamically assigned |
| 1 | 1 | 1 | 1 | 1 | 1 | 1 | } | |

In accordance with exemplary embodiments of the disclosed solution, in order to allow an SGSN to realize when it has received a low priority NAS signaling message from a wireless communication device and thereby seize upon an opportunity for mitigating radio interface congestion, a new PFI value (e.g. 0000100) is introduced by taking a value from the set of values currently indicated as reserved. Referring also to Table 4 below, this new value indicates that the corresponding NAS signaling message can be treated as "low priority," thereby allowing the SGSN to reduce future instances of that NAS signaling message initiated by that wireless communication device. The SGSN response to receiving this new code point is optional, i.e., it is not mandatory for the SGSN to treat it as a low priority message.

TABLE 4

Enhanced PFI Value Coding
Packet Flow Identifier value (octet 3)

Bits

| 7 | 6 | 5 | 4 | 3 | 2 | 1 | | |
|---|---|---|---|---|---|---|---|---|
| 0 | 0 | 0 | 0 | 0 | 0 | 0 | Best Effort | |
| 0 | 0 | 0 | 0 | 0 | 0 | 1 | Signaling | |
| 0 | 0 | 0 | 0 | 0 | 1 | 0 | SMS | |
| 0 | 0 | 0 | 0 | 0 | 1 | 1 | TOM8 | |
| 0 | 0 | 0 | 0 | 1 | 0 | 0 | Low Priority Signalling | |
| 0 | 0 | 0 | 0 | 1 | 0 | 1 | } | |
| | | | to | | | | } | reserved |
| 0 | 0 | 0 | 0 | 1 | 1 | 1 | } | |
| 0 | 0 | 0 | 1 | 0 | 0 | 0 | } | |
| | | | to | | | | } | dynamically assigned |
| 1 | 1 | 1 | 1 | 1 | 1 | 1 | } | |

CS Domain

In accordance with 3GPP Technical Specifications 44.006 and 44.018, in the CS domain, upon seizure of the assigned dedicated channel or group channel, a wireless communication device establishes the main signaling link on this channel by sending a layer 2 SABM frame containing a layer 3 service request message. The data link layer stores this layer 3 service request message to perform the contention resolution. The layer 3 service request message is then returned by the network in the unnumbered acknowledgement (UA) frame. The data link layer in the wireless communication device compares the content of the information field (i.e., the layer 3 service request message) received in the UA frame with the stored message, and leaves the channel in case they do not match. This procedure resolves contentions in the case where several wireless communication devices have accessed at the same random access slot and with the same random reference and one has succeeded due to capture. However, when this procedure is used to respond to an encapsulated IMMEDIATE ASSIGNMENT message or an encapsulated DTM ASSIGNMENT message, random access and contention resolution are not used.

The purpose of the service request message is to indicate to the network which service is being requested by the wireless communication device. This then allows the network to decide how to proceed (e.g. to authenticate or not). The service request message must contain the identity of the wireless communication device and may include further information which can be sent without encryption.

A conventional layer 3 service request message is typically one of the following:
 CM SERVICE REQUEST;
 LOCATION UPDATING REQUEST;
 IMSI DETACH;
 PAGING RESPONSE;
 CM RE-ESTABLISHMENT REQUEST;
 NOTIFICATION RESPONSE;
 IMMEDIATE SETUP.

In accordance with 3GPP Technical Specification 48.008, a description of the layer 3 information is shown below in Table 5. The layer 3 service request message is sent from the BSS to the MSC via the BSS Application Part (BSSAP) Signaling Connection Control Part (SCCP) connection established for the associated dedicated resource(s).

TABLE 5

Complete Layer 3 Description

| INFORMATION ELEMENT | REFERENCE | DIRECTION | TYPE | LEN |
|---|---|---|---|---|
| Message Type | 3.2.2.1 | BSS-MSC | M | 1 |
| Cell Identifier | 3.2.2.17 | BSS-MSC | M | 3-10 |
| Layer 3 Information | 3.2.2.24 | BSS-MSC | M | 3-n |
| Chosen Channel | 3.2.2.33 | BSS-MSC | O (note 1) | 2 |
| LSA Identifier List | 3.2.2.16 | BSS-MSC | O (note 2) | 3 + 3n |
| PADU | 3.2.2.68 | BSS-MSC | O (note 3) | 3-n |
| Codec List (BSS Supported) | 3.2.2.103 | BSS-MSC | O (note 4) | 3-n |

(note 1): This element is optionally used by the BSS to give the MSC a description of the channel rate/type on which the initial layer 3 message was received.
(note 2): This element shall be included at least when the current cell belongs to one or more LSAs.
(note 3): This element is optionally used by the BSS to provide Location Services related information to MSC.
(note 4): Codec List (BSS Supported) shall be included, if the radio access network supports an IP based user plane interface.

Referring to Table 6, the "Layer 3 Information" information element is a variable length element used to pass radio interface messages from one network entity to another.

TABLE 6

Layer 3 Information Element Data Structure

| 8 | 7 | 6 | 5 | 4 | 3 | 2 | 1 | |
|---|---|---|---|---|---|---|---|---|
| | | | Element identifier | | | | | octet 1 |
| | | | Length | | | | | octet 2 |
| | | | Layer 3 information | | | | | octet 3-n |

Octet 1 identifies the element. Octet 2 gives the length of the following layer 3 information. Octet j (j=3, 4, . . . , n) is the unchanged octet j-2 of either a radio interface layer 3 message as defined in 3GPP Technical Specification 44.018; or "Handover To UTRAN Command," as defined in Universal Mobile Telecommunications System (UMTS) 25.331, where n-2 is equal to the length of that radio interface layer 3 message.

In accordance with exemplary embodiments of the disclosed solution, in order to allow an MSC to realize when it has received a low priority NAS signaling message from a wireless communication device and thereby seize upon an opportunity for mitigating radio interface congestion, a new layer 3 service request message called "LOCATION UPDATING REQUEST—LOW PRIORITY" message is introduced. Upon receiving this message within a layer 2 SABM frame, the BSS relays the message to the MSC in the same manner as is currently performed in regard to a "LOCATION UPDATING REQUEST" message. The MSC response to receiving this new layer 3 service request message is optional, i.e., it is not mandatory for the MSC to treat it as a low priority message.

Thus, in accordance with exemplary embodiments of the disclosed solution, the layer 3 service request message will typically include one of the following:
CM SERVICE REQUEST;
LOCATION UPDATING REQUEST;
LOCATION UPDATING REQUEST—LOW PRIORITY;
IMSI DETACH;
PAGING RESPONSE;
CM RE-ESTABLISHMENT REQUEST;
NOTIFICATION RESPONSE;
IMMEDIATE SETUP.

Figure 4:
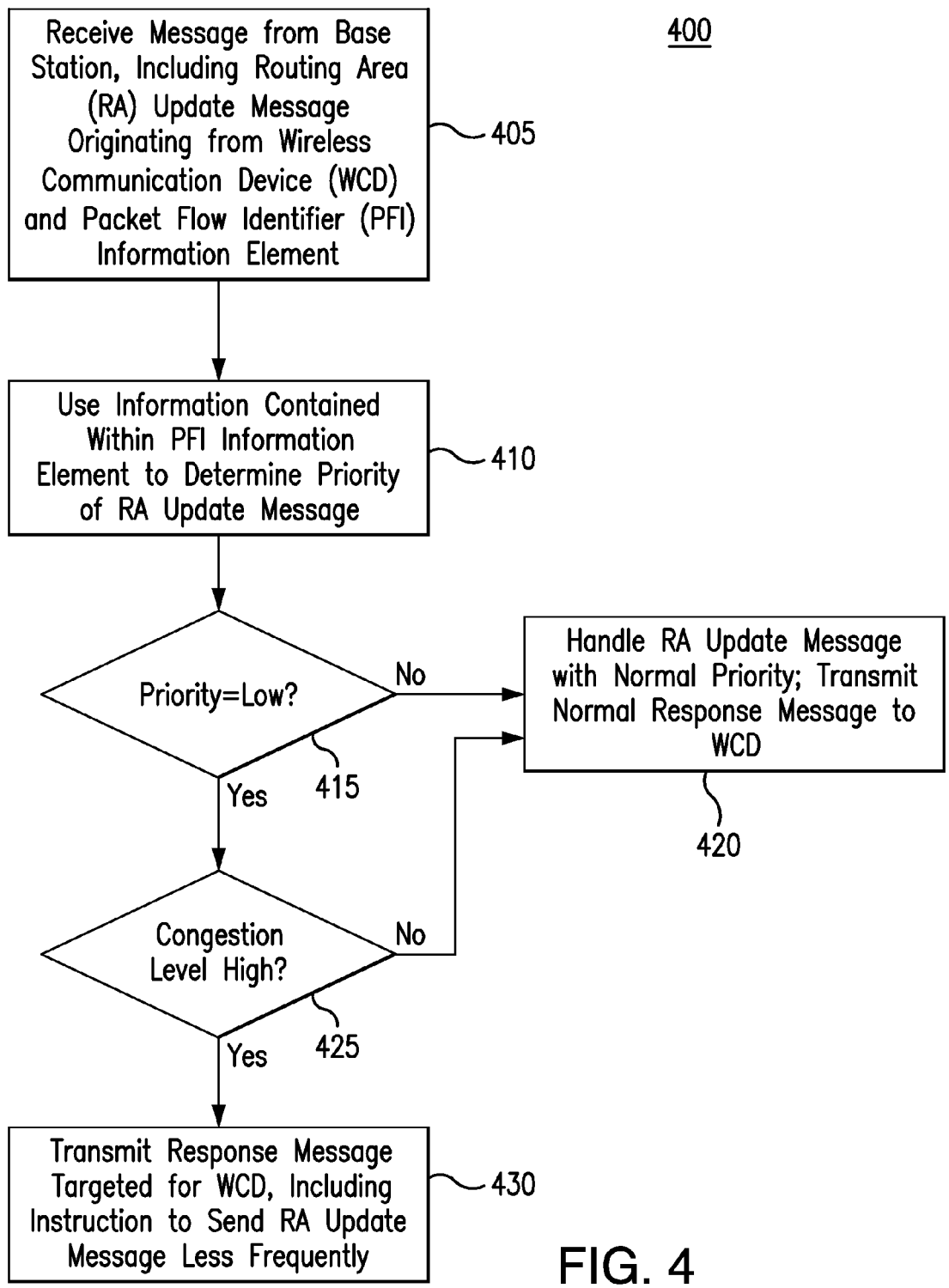
FIG. 4 is a flow chart illustrating a process for determining a priority level of a NAS signaling message and responding to the NAS signaling message, in accordance with exemplary embodiments of the disclosed solution.

Referring now to FIG. 4, a flow chart illustrating a process 400 for determining a priority level of a particular type of NAS signaling message known as a Routing Area (RA) Update message and responding to the RA Update message, in accordance with exemplary embodiments of the disclosed solution, is shown. The process begins at 405 when a core network node, e.g., an SGSN 120, receives a message from a base station 115. The received message includes an RA Update message originating from a wireless communication device 105. The received message also includes a PFI information element. Next, at 410, the SGSN 120 uses information contained within the PFI information element to determine the priority level of the received RA Update message. Then, at 415, the SGSN 120 determines whether the priority level of the RA Update message is a low priority message. If the priority level is not low, then at 420, the SGSN 120 handles the RA Update message at a normal priority level, and transmits a normal response message to the wireless communication device 105. If the priority level is low, then at 425, the SGSN 120 determines whether the congestion level in the network is high. If the congestion level in the network is not high, then the SGSN may handle the RA message in a normal manner at 420. However, if the congestion level is high, then at 430, the SGSN 120 transmits a response message targeted for the wireless communication device 105, where the response message includes responsive information (e.g., an instruction) indicating that the RA Update message is to be sent less frequently. For example, the response message may include an instruction that causes the wireless communication device 105 to wait at least a certain amount of time before sending another RA Update message, and the instruction may specify the certain amount of time. For instance, in some embodiments, the instruction specifies the frequency with which the wireless communication device 105 should send RA Update messages.

Figure 5:
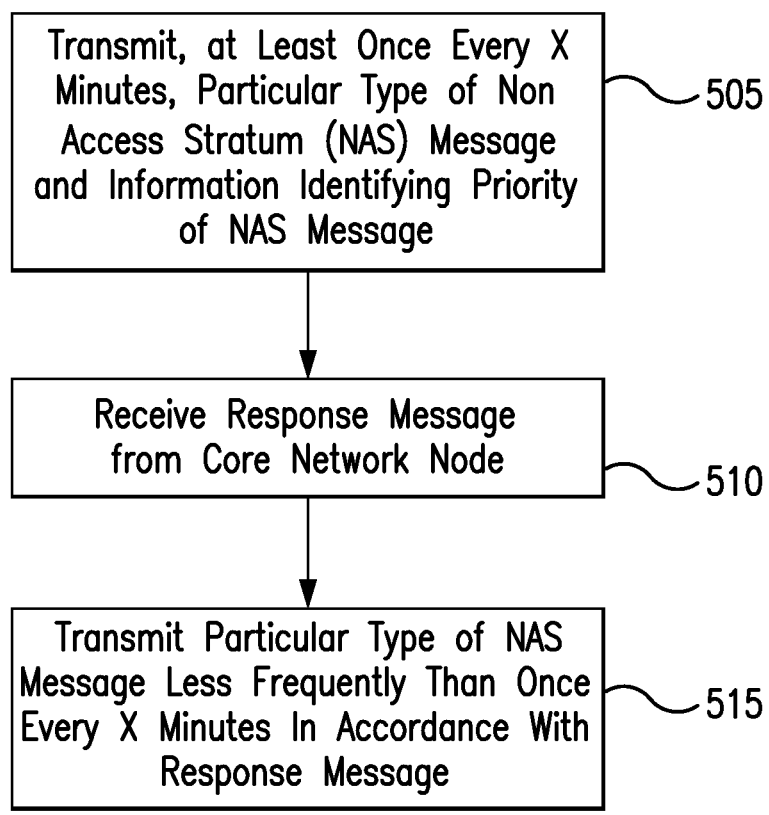
FIG. 5 is a flow chart illustrating a process for transmitting a NAS signaling message with priority level information and handling a response message based on the priority level information, in accordance with exemplary embodiments of the disclosed solution.

Referring now to FIG. 5, a flow chart illustrating a process 500 for transmitting a NAS signaling message with priority level information and handling a response message based on the priority level information, in accordance with exemplary embodiments of the disclosed solution, is shown. First, at 505, a wireless communication device 105 transmits a particular type of NAS signaling message together with information identifying a priority level of the transmitted NAS signaling message. The wireless communication device 105 may be initially configured to transmit the particular type of NAS signaling message at least once every X minutes. Then, at 510, the wireless communication device 105 receives a response message from a core network node, such as, for example, an SGSN 120 or an MSC 125. Finally, at 515, in accordance with an instruction included in the response message, the wireless communication device 105 transmits the particular type of NAS signaling message less frequently than once every X minutes. In some instances, the response message may specify a minimum interval of Y minutes, such that the wireless communication device is reconfigured to transmit the particular type of NAS signaling message not more often than once every Y minutes in the future.

Figure 6:
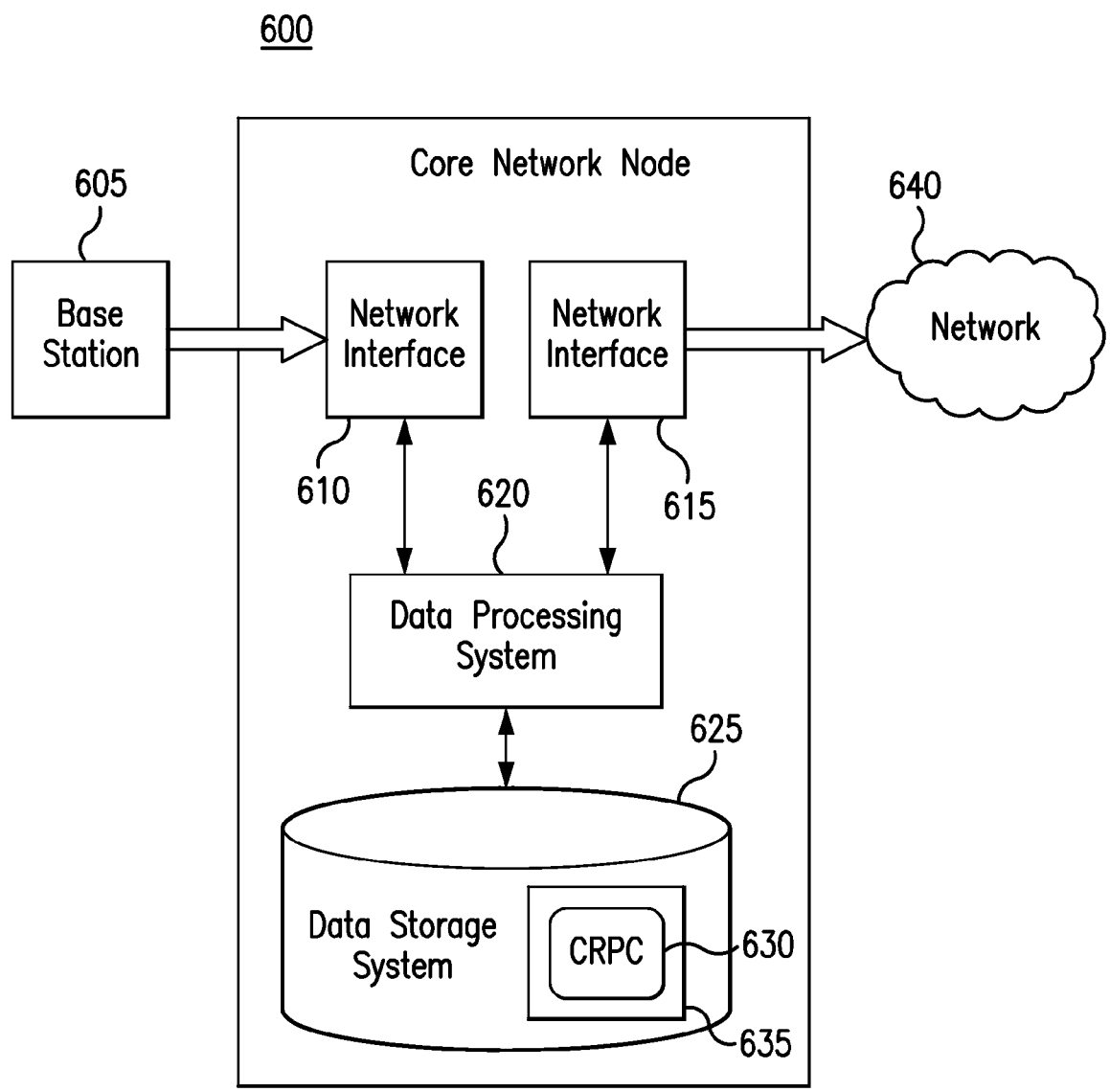
FIG. 6 is a block diagram of a core network node as used in the system of FIG. 1.

Referring now to FIG. 6, FIG. 6 illustrates a block diagram of a core network node (e.g., SGSN 120 or MSC 125) according to some embodiments of the invention. As shown in FIG. 6, the core network node may include: a data processing system 620, which may include one or more microprocessors and/or one or more circuits, such as an application specific integrated circuit (ASIC), Field-programmable gate arrays (FPGAs), etc; network interfaces 610 and 615; and a data storage system 625, which may include one or more non-volatile storage devices and/or one or more volatile storage devices (e.g., random access memory (RAM)). In embodiments where data processing system 620 includes a microprocessor, computer readable program code 630 may be stored in a computer readable medium 635, such as, but not limited, to magnetic media (e.g., a hard disk), optical media (e.g., a DVD), memory devices (e.g., random access memory), etc. In some embodiments, computer readable program code 630 is configured such that when executed by a processor, code 630 causes the core network node to perform steps described above (e.g., steps described above with reference to the flow chart shown in FIGS. 2 and 4). In other embodiments, the core network node is configured to perform steps described above without the need for code 630. That is, for example, data processing system 620 may consist merely of one or more ASICs. Hence, the features of the present invention described above may be implemented in hardware and/or software. For example, in particular embodiments, the functional components of the core network node described above may be implemented by data processing system 620 executing computer instructions 630, by data processing system 620 operating independent of any computer instructions 630, or by any suitable combination of hardware and/or software.

Figure 7:
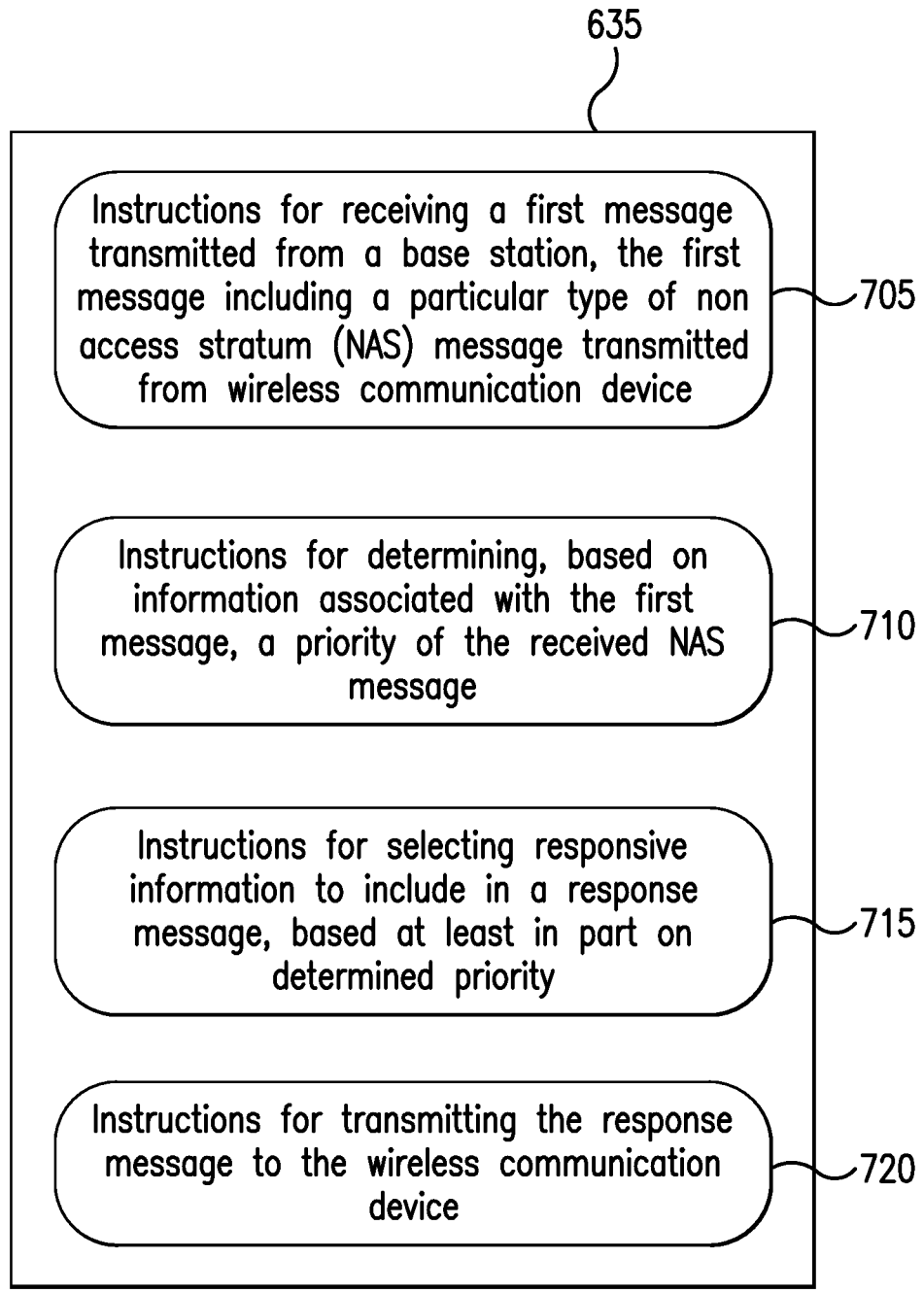
FIG. 7 is a block diagram illustrating example software components of a core network node.

Referring now to FIG. 7, FIG. 7 illustrates an embodiment of computer readable program code (CRPC) 630. In the embodiment shown, CRPC 630 includes: (a) a set of instructions 705 for receiving a first message transmitted from a base station, the first message including a particular type of NAS signaling message transmitted from a wireless communication device; (b) a set of instructions 710 for determining, based on information associated with the first message, a priority of the received NAS signaling message; (c) a set of instructions 715 for selecting responsive information to include in a response message, based at least in part on determined priority; and (d) a set of instructions 720 for transmitting the response message to the wireless communication device.

Figure 8:
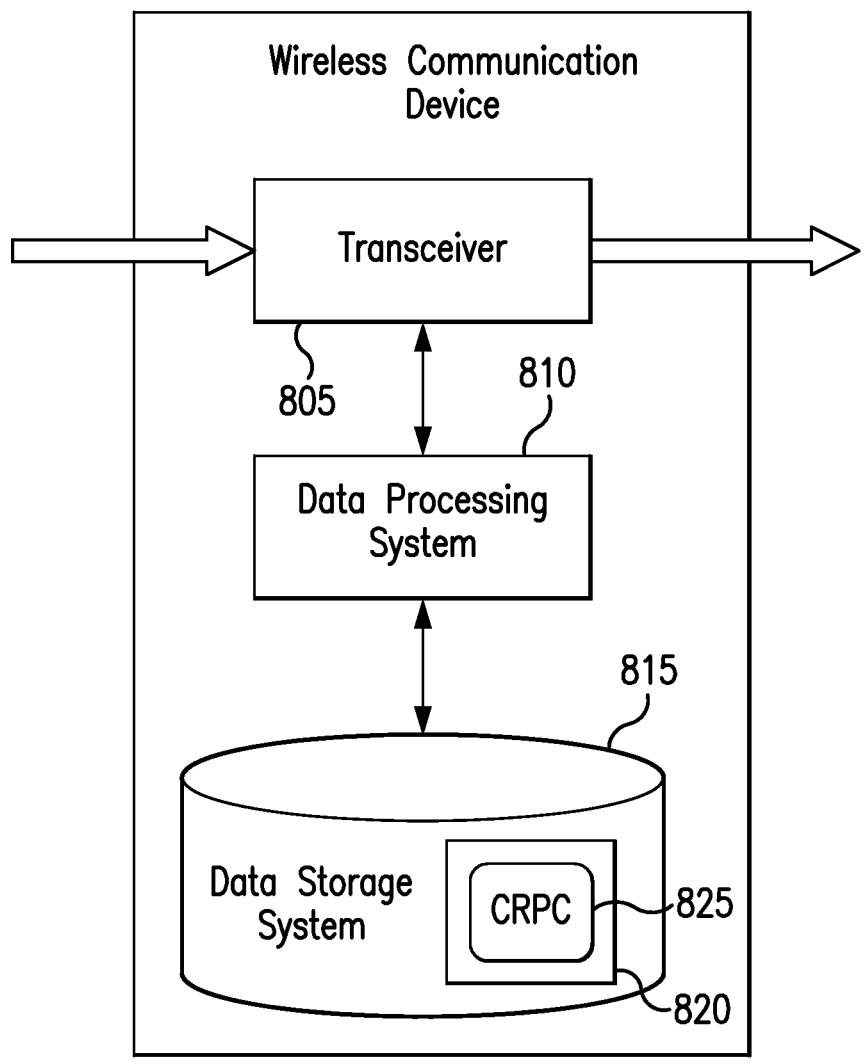
FIG. 8 is a block diagram of a wireless communication device as used in the system of FIG. 1.

Referring now to FIG. 8, FIG. 8 illustrates a block diagram of wireless communication device 105 according to some embodiments of the invention. As shown in FIG. 8, wireless communication device 105 may include: a data processing system 810, which may include one or more microprocessors and/or one or more circuits, such as an application specific integrated circuit (ASIC), Field-programmable gate arrays (FPGAs), etc; a transceiver 805 for transmitting data to (and receiving data from) base station 110; and a data storage system 815, which may include one or more non-volatile storage devices and/or one or more volatile storage devices (e.g., random access memory (RAM)). In embodiments where data processing system 810 includes a microprocessor, computer readable program code 825 may be stored in a computer readable medium 820, such as, but not limited, to magnetic media (e.g., a hard disk), optical media (e.g., a DVD), memory devices (e.g., random access memory), etc. In some embodiments, computer readable program code 825 is configured such that when executed by a processor, code 825 causes wireless communication device 105 to perform steps described above (e.g., steps described above with reference to the flow chart shown in FIG. 5). In other embodiments, wireless communication device 105 is configured to perform steps described above without the need for code 825. That is, for example, data processing system 810 may consist merely of one or more ASICs. Hence, the features of the present invention described above may be implemented in hardware and/or software. For example, in particular embodiments, the functional components of wireless communication device 105 described above may be implemented by data processing system 810 executing computer instructions 825, by data processing system 810 operating independent of any computer instructions 825, or by any suitable combination of hardware and/or software.

Figure 9:
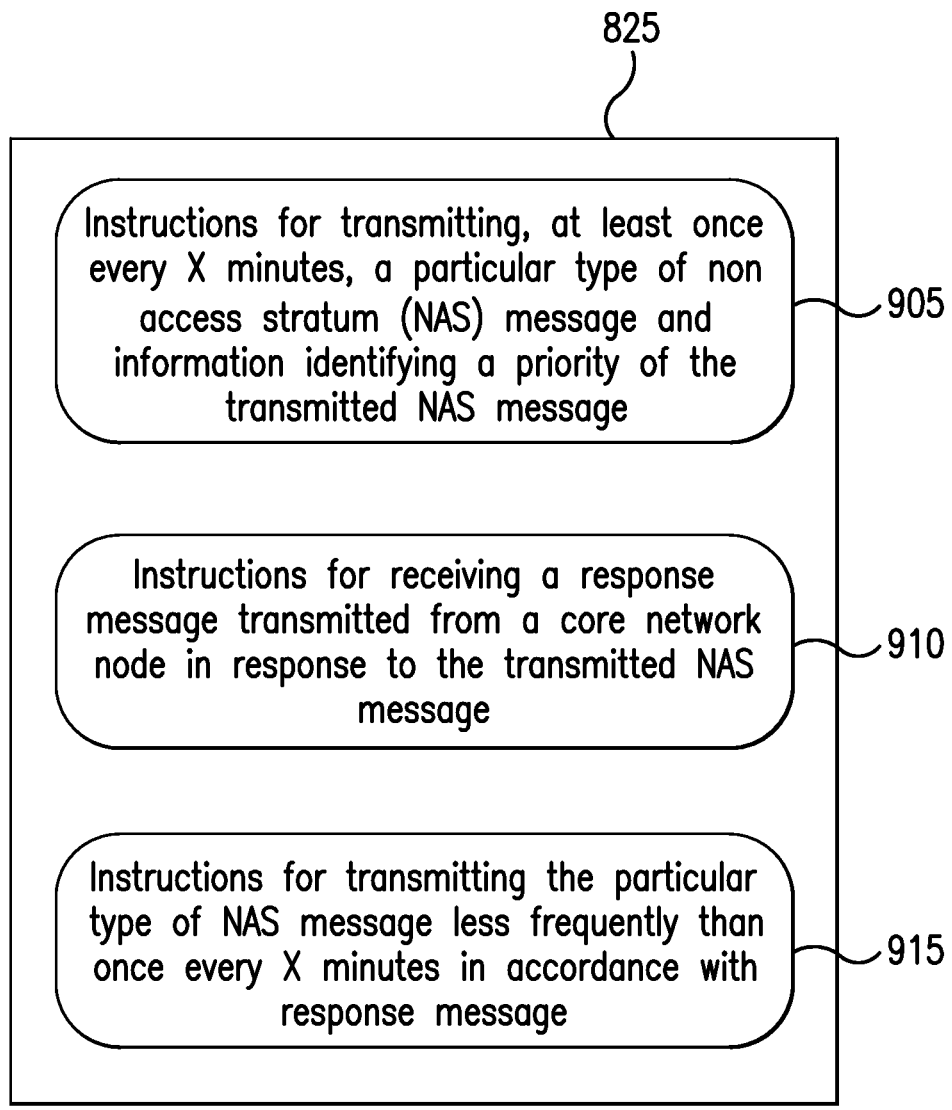
FIG. 9 is a block diagram illustrating example software components of a wireless communication device.

Referring now to FIG. 9, FIG. 9 illustrates an embodiment of computer readable program code (CRPC) 825. In the embodiment shown, CRPC 825 includes: (a) a set of instructions 905 for transmitting, at least once every X minutes, a particular type of NAS signaling message and information identifying a priority level of the transmitted NAS signaling message; (b) a set of instructions 910 for receiving a response message transmitted from a core network node in response to the transmitted NAS signaling message; and (c) a set of instructions 915 for transmitting the particular type of NAS signaling message less frequently than once every X minutes in accordance with the response message.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A core network node for use in a wireless communication system, the core network node comprising:
   one or more network interfaces for receiving from a base station a first message comprising a second message that was transmitted by a wireless communication device and received at the base station, wherein the second message comprises a particular type of non access stratum (NAS) signaling message targeted to the core network node; and
   a data processing system for (i) determining, based on information contained in the first message, a priority level of the received NAS signaling message; and (ii) selecting responsive information to include in a response NAS signaling message in response to receiving the NAS signaling message, wherein the selection of the responsive information is based at least in part on the determined priority level of the received NAS signaling message;
   wherein the one or more network interfaces are further for transmitting to the wireless communication device the response NAS signaling message containing the selected responsive information.

2. The core network node of claim 1, wherein
   the one or more network interfaces are configured to transmit the particular type of NAS signaling message at least once every X minutes, and
   the responsive information instructs the wireless communication device to transmit the particular type of NAS signaling message less frequently than once every X minutes.

3. The core network node of claim 2, wherein the particular type of NAS signaling message is a Routing Area (RA) Update request message.

4. The core network node of claim 1, wherein
the first message is an uplink (UL) UNITDATA message,
the second message is an Logical Link Control (LLC) protocol data unit (PDU) comprising the NAS signaling message,
the UL-UNITDATA message further comprises a Packet Flow Identifier (PFI) information element, and
the data processing system is configured to determine the priority level of the received NAS signaling message by examining the PFI information element.

5. The core network node of claim 4, wherein
the PFI information element comprises a PFI value, and
the data processing system is configured to determine the priority level of the received NAS signaling message using the PFI value.

6. The core network node of claim 5, wherein the data processing system is configured to determine the priority level of the received NAS signaling message by performing a method that consists of determining whether the PFI value is equal to a predetermined value, wherein
the data processing system is configured such that if the PFI value is equal to the predetermined value, then the data processing system determines that the received NAS signaling message has a low priority.

7. The core network node of claim 1, wherein
the responsive information is configured to cause the wireless communication device to wait at least a certain amount of time before sending the particular type of NAS signaling message again, and
the responsive information specifies the certain amount of time.

8. A method for processing non-access stratum (NAS) messages transmitted by a wireless communication device, comprising:
receiving, at a core network node, a first message transmitted from a base station, the first message comprising a second message that was transmitted by the wireless communication device and received at the base station, wherein the second message comprises a particular type of NAS signaling message targeted to the core network node;
determining, based on information contained in the first message, a priority level of the received NAS signaling message;
in response to receiving the NAS signaling message, selecting responsive information to include in a response NAS signaling message, wherein the selection of the responsive information is based at least in part on the determined priority level of the received NAS signaling message; and
transmitting from the core network node to the wireless communication device the response NAS signaling message containing the selected responsive information.

9. The method of claim 8, wherein
the wireless communication device is configured to transmit the particular type of NAS signaling message at least once every X minutes, and
the responsive information instructs the wireless communication device to transmit the particular type of NAS signaling message less frequently than once every X minutes.

10. The method of claim 9, wherein the particular type of NAS signaling message is a Routing Area (RA) Update request message.

11. The method of claim 8, wherein
the first message is an uplink (UL) UNITDATA message,
the second message is an Logical Link Control (LLC) protocol data unit (PDU) comprising the NAS signaling message,
the UL-UNITDATA message further comprises a Packet Flow Identifier (PFI) information element, and
the method further comprises determining the priority level of the received NAS signaling message by examining the PFI information element.

12. The method of claim 11, wherein
the PFI information element comprises a PFI value, and
the method further comprises determining the priority level of the received NAS signaling message using the PFI value.

13. The method of claim 12, wherein the method further comprises determining whether the PFI value is equal to a predetermined value, wherein
if the PFI value is equal to the predetermined value, then the received NAS signaling message is determined to have a low priority.

14. The method of claim 8, wherein
the responsive information instructs the wireless communication device to wait at least a certain amount of time before sending the particular type of NAS signaling message again, and
the responsive information specifies the certain amount of time.

15. A wireless communication device for use in a wireless communication system, the wireless communication device comprising:
a transceiver for: (i) transmitting a message comprising a particular type of non access stratum (NAS) signaling message targeted to a core network node and information identifying a priority level of the transmitted NAS signaling message; and (ii) receiving a response NAS signaling message from the core network node, the response message containing information which is responsive to the transmitted priority information, wherein
prior to receiving the response NAS signaling message, the transceiver is configured to transmit the particular type of NAS signaling message at least once every X minutes, and
in response to receiving the response NAS signaling message, the transceiver is configured to transmit the particular type of NAS signaling message less frequently than once every X minutes.

16. The wireless communication device of claim 15, wherein the transceiver is further configured to transmit the NAS signaling message by transmitting one or more Radio Link Control (RLC) data blocks each including a corresponding RLC data block header, and the transceiver is further configured to transmit the priority information by including the priority information in (a) at least one of said RLC data block headers or (b) a radio resource control message transmitted from the wireless communication device to the base station immediately prior to starting the transmission of the NAS signaling message.

17. The wireless communication device of claim 15, wherein
the wireless communication device is configured such that, in response to receiving the response NAS signaling message, the wireless communication device waits at least a certain amount of time before sending the particular type of NAS signaling message again, and the responsive information specifies the certain amount of time.

18. A non access stratum signaling method performed by a wireless communication device configured to transmit a particular type of non access stratum (NAS) message at least once every X minutes, the method comprising:
- transmitting, from the wireless communication device, a first message comprising the particular type of NAS signaling message and information identifying a priority level of the transmitted NAS signaling message;
- receiving a response NAS signaling message transmitted from a core network node in response to the transmitted NAS signaling message; and
- in response to receiving the response NAS signaling message, transmitting the particular type of NAS signaling message less frequently than once every X minutes.

19. The method of claim 18, wherein
the responsive information includes an instruction to transmit the particular type of NAS signaling message not more than once every Y minutes.

20. The method of claim 18, further comprising
in response to the response NAS signaling message, waiting at least a certain amount of time before sending the particular type of NAS signaling message again, wherein the responsive information specifies the certain amount of time.

* * * * *